United States Patent [19]

Thuries et al.

[11] Patent Number: 5,496,965

[45] Date of Patent: Mar. 5, 1996

[54] LINE FOR CONVEYING ELECTRICAL POWER

[75] Inventors: Edmond Thuries, Pusignan; Gilles Voisin, Vaugneray; Ren´´ Tixier, Lyons, all of France

[73] Assignee: GEC Alsthom T & D SA, Paris, France

[21] Appl. No.: 311,058

[22] Filed: Sep. 23, 1994

[30] Foreign Application Priority Data

Sep. 27, 1993 [FR] France .................. 93 11454

[51] Int. Cl.$^6$ .................................................. H01B 9/06
[52] U.S. Cl. ...................... 174/24; 174/14 R; 174/16.2; 174/28
[58] Field of Search .................... 174/24, 26 R, 174/26 G, 28, 105 R, 106 R, 99 R, 99 B, 16.2, 14 R

[56] References Cited

U.S. PATENT DOCUMENTS

| Re. 27,397 | 6/1972 | Babigan | 174/9 F |
|---|---|---|---|
| Re. 31,949 | 7/1985 | Hopkins | 174/14 R |
| 3,751,578 | 8/1973 | Hoffmann | 174/99 B |
| 3,767,837 | 10/1973 | Graybill | 174/27 |
| 4,110,551 | 8/1978 | Cookson | 174/27 |
| 4,297,523 | 10/1981 | Floessel et al. | 174/27 |
| 4,335,267 | 6/1982 | Hopkins | 174/14 R |
| 4,370,511 | 1/1983 | Cookson et al. | 174/14 R |
| 4,372,043 | 2/1983 | Cookson | 29/828 |
| 4,404,423 | 9/1983 | Sakakibara et al. | 174/27 |
| 4,743,709 | 5/1988 | Meyer et al. | 174/28 |
| 5,089,665 | 2/1992 | Thuries | 174/27 |

FOREIGN PATENT DOCUMENTS

| 2502410 | 9/1982 | France . |
|---|---|---|
| 2509080 | 1/1983 | France . |
| 2316100 | 10/1974 | Germany . |
| WO7900607 | 8/1979 | WIPO . |

*Primary Examiner*—Morris H. Nimmo
*Attorney, Agent, or Firm*—Sughrue, Mion, Zinn, Macpeak & Seas

[57] ABSTRACT

A three-phase electrical power line comprising a sealed tubular envelope of steel filled with insulating gas under pressure, e.g. nitrogen or carbon dioxide $CO_2$, and having three conductive bars placed therein together with a thin tubular envelope of aluminum which is located between the steel envelope and the bars, wherein the conductive bars are held by collars made of non-magnetic material, having an outside diameter equal to the inside diameter of the aluminum tubular envelope, and possessing three radial arms which are screwed to tabs of insulating supports that enclose the conductive bars.

3 Claims, 2 Drawing Sheets

LINE FOR CONVEYING ELECTRICAL POWER

The present invention relates to a line for conveying electrical power.

BACKGROUND OF THE INVENTION

In French patent application No. 89 13488 of Oct. 16, 1989, and No. 92 06733 of Jun. 3, 1992, the Applicant has described a three-phase line for conveying electrical power, using compressed nitrogen insulation and designed to be placed on or buried in the ground. That electricity line comprises a steel outer envelope having three conductors disposed therein, each corresponding to one of the phases, each conductor being surrounded by a respective envelope that protects it from dust. The resultant of the magnetic field due to the flow of balanced current in the three conductors is substantially zero at a short distance (several meters) such that such a line does not present any danger for people living nearby. However, at the short distance between the steel tube and the conductors themselves, the magnetic field remains large, and therefore causes eddy currents to appear in the steel tube which in turn generate Joule losses that give rise to heating.

It is known, in particular from document WO-A-79 00607, to reduce the above-mentioned losses by placing a screen of non-magnetic metal, e.g. aluminium, between the conductors and the steel envelope.

OBJECTS AND SUMMARY OF THE INVENTION

An object of the present invention is to define means that are simple, robust, and cheap for holding both the electrical current conductors and the aluminum screen inside the steel envelope of a gas-insulated power line.

Another object of the invention is to provide a line in which the conductors are protected from dust.

The present invention provides a three-phase electrical power line comprising a sealed tubular envelope of steel filled with insulating gas under pressure, e.g. nitrogen or carbon dioxide $CO_2$, and having three conductive bars placed therein together with a thin tubular envelope of aluminum which is located between the steel envelope and the bars, wherein the conductive bars are held by collars made of non-magnetic material, having an outside diameter equal to the inside diameter of the aluminum tubular envelope, and possessing three radial arms which are screwed to tabs of insulating supports that enclose the conductive bars.

BRIEF DESCRIPTION OF THE DRAWINGS

The invention is explained in greater detail with reference to the accompanying drawings, in which.

MORE DETAILED DESCRIPTION

Figure 1:
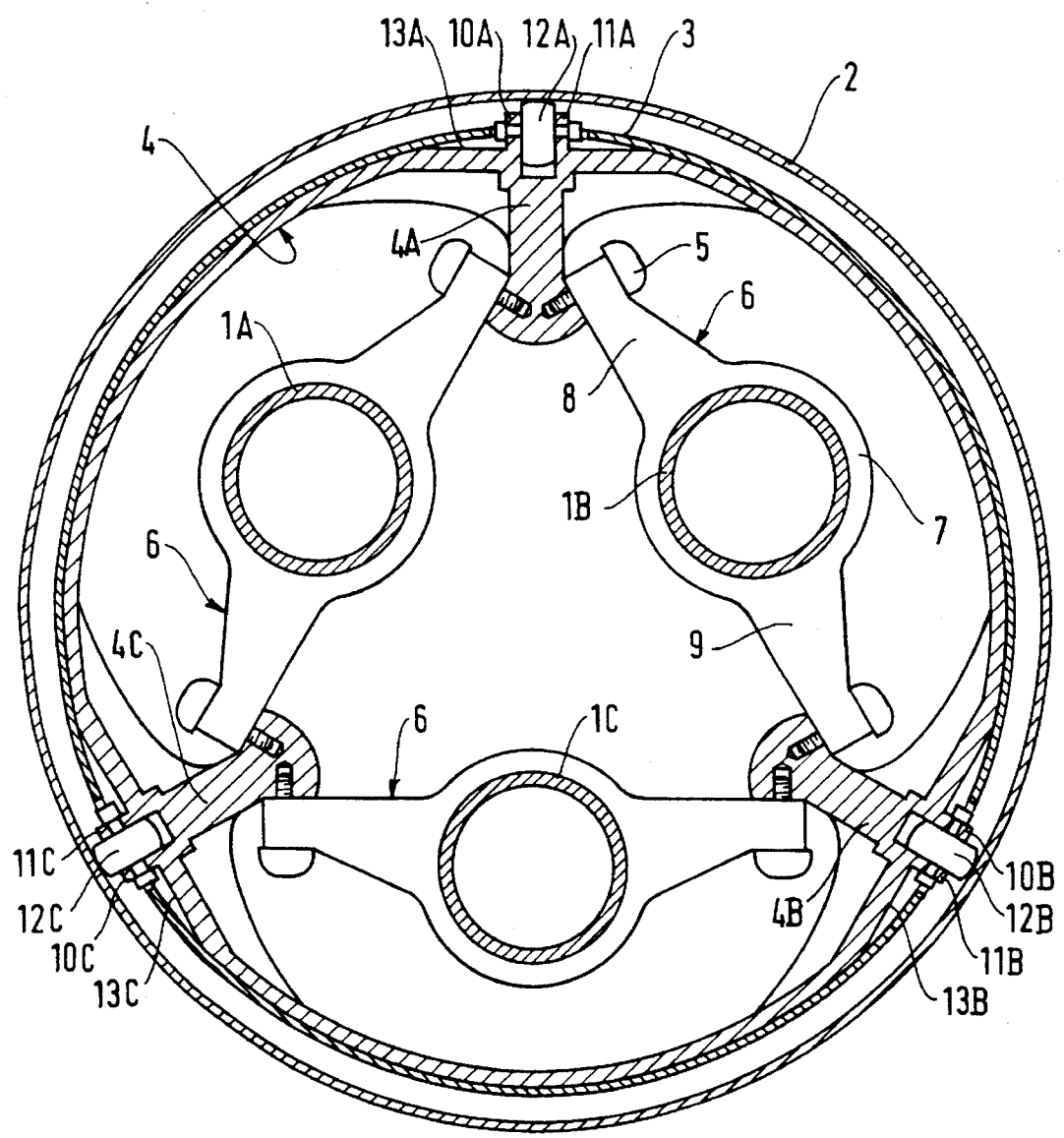
FIG. 1 is a cross-section view through a line of the invention.
Figure 2:
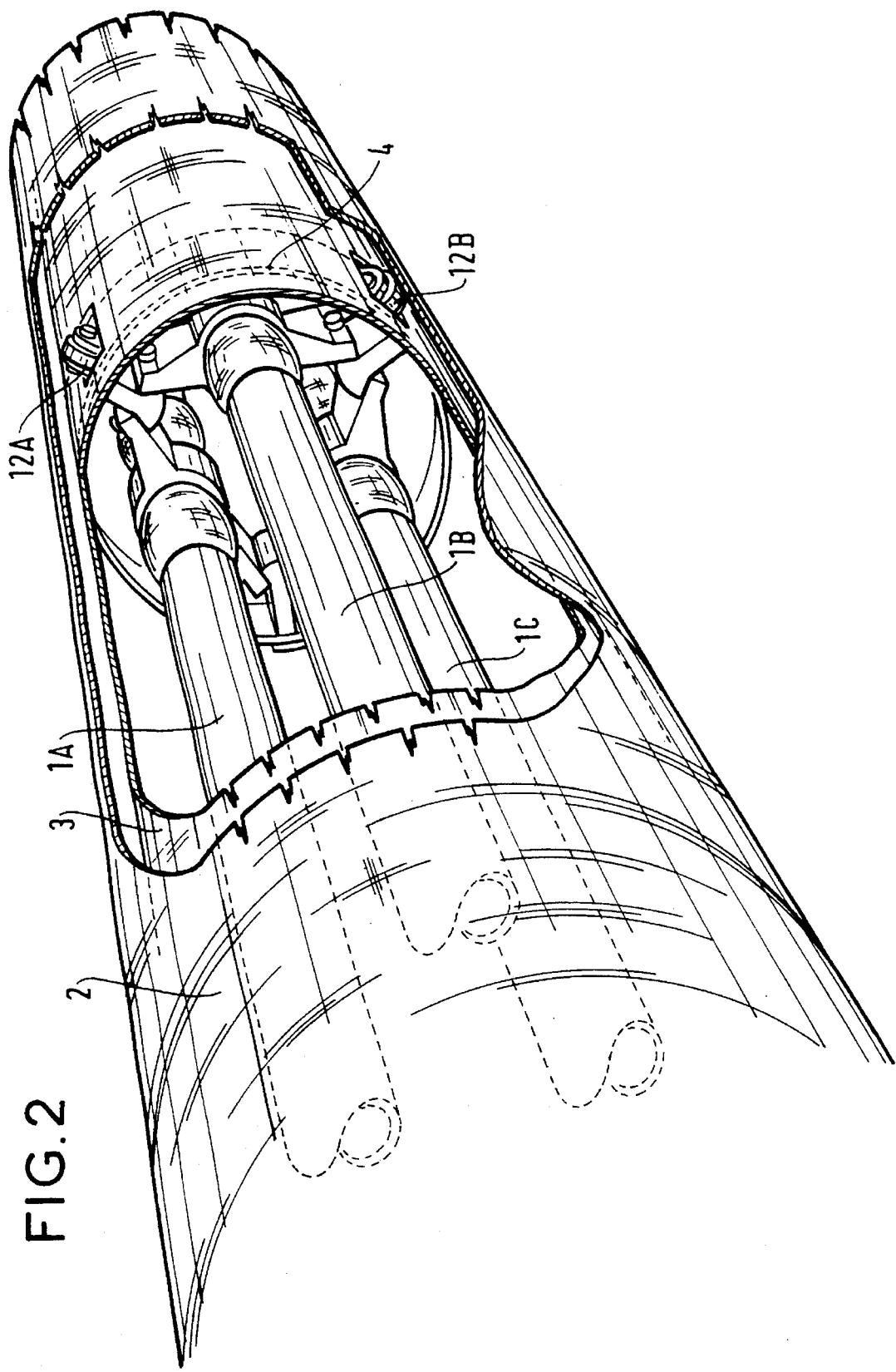
FIG. 2 is a partially cutaway perspective view of the same line.

In FIG. 1, references 1A, 1B, and 1C designate three conductive bars, e.g. made of copper, that are tubular, and of a cross-section that matches the amount of current they are required to convey.

The bars are disposed inside a tubular envelope 2 made of steel and filled with nitrogen at a pressure lying in the range 8 hectopascals to 15 hectopascals. In a variant, the insulating gas is carbon dioxide $CO_2$. The steel tube is sealed against the surroundings outside it.

The resultant of the magnetic field due to the flow of balanced three-phase current in the conductors is substantially zero at a distance of several meters, such that the electricity lines presents no danger for people living nearby, even if the line is merely received in a gutter.

However, at the short distance between the steel tube and the conductors themselves, the magnetic field remains large, and in order to avoid eddy current losses in the steel tube, a thin tubular envelope 3 of aluminum is disposed coaxially with the steel tube, and around the conductive bars.

From place to place along the aluminum tube, collars 4, preferably made of non-magnetic metal, are located that have an outside diameter equal to the inside diameter of the aluminum tube, and that have three arms 4A, 4B, and 4C at 120° intervals from one another and extending axially towards the axis of the line.

Each of these arms has tapped holes suitable for receiving screws 5 of insulating supports such as 6, each of which includes a central portion 7 that fits around a conductive bar, together with two tabs 8 and 9. The supports 6 are preferably made of epoxy resin. They enable the bars to be held rigidly, particularly when large electrodynamic forces are developed as produced by short circuit currents.

The collar 4 has pairs of lugs 10A–11A, 10B–11B, 10C–11C integrally molded therewith, preferably in register with its arms, and serving to receive wheels 12A, 12B, and 12C enabling the tube 3 to run along the inside wall of the steel tube. The aluminum tube has notches through which the wheels pass, however sealing against dust is conserved by the presence of the insulating collar.

In register with the arms and with the wheel lugs, the collar has flats 13A, 13B, and 13C that enable the aluminum tube 3 to be disposed as close as possible to the steel tube 1.

The structure of the invention is simple, cheap, robust, and is easily assembled, while nevertheless providing the conductors with protection against dust.

We claim:

1. A three-phase electrical power line comprising a sealed tubular envelope of steel filled with insulating gas under pressure, e.g. nitrogen or carbon dioxide $CO_2$, and having three conductive bars placed therein together with a thin tubular envelope of aluminum which is located between the steel envelope and the bars, wherein the conductive bars are held by collars made of non-magnetic material, having an outside diameter equal to the inside diameter of the aluminum tubular envelope, and possessing three radial arms which are screwed to tabs of insulating supports that enclose the conductive bars.

2. An electricity line according to claim 1, wherein in register with the arms, the collars possess pairs of lugs for receiving wheels that run on the inside surface of the steel envelope, the aluminum envelope having slots for receiving the wheels.

3. An electricity line according to claim 2, wherein the arms of the collars are placed on flats of the collars.

* * * * *